United States Patent [19]

Iwata

[11] Patent Number: 5,371,881
[45] Date of Patent: Dec. 6, 1994

[54] UNIVERSAL TIMING CONTROLLER FOR VIDEO TAPE RECORDER SERVO SYSTEM OF DIFFERENT FORMATS USING TIME MULTIPLEXED SWITCHING NETWORK

[75] Inventor: Katsumi Iwata, Tokyo, Japan

[73] Assignee: Hitachi, Ltd., Tokyo, Japan

[21] Appl. No.: 973,536

[22] Filed: Nov. 9, 1992

Related U.S. Application Data

[63] Continuation of Ser. No. 413,265, Sep. 27, 1989, abandoned.

[30] Foreign Application Priority Data

Oct. 3, 1988 [JP] Japan .................................. 63-249669

[51] Int. Cl.$^5$ .................. G06F 13/00; G11B 27/10; H04L 12/52
[52] U.S. Cl. .................. 395/550; 360/73.06; 360/73.07; 360/78.07; 360/78.09; 364/238.2; 364/270; 364/929.1; 364/934.3; 364/DIG. 2; 364/238; 395/500
[58] Field of Search ............ 395/325, 550, 775, 500, 395/550; 360/73.06, 73.07, 78.07, 78.09

[56] References Cited

U.S. PATENT DOCUMENTS

| | | | |
|---|---|---|---|
| 4,051,353 | 9/1977 | Lee | 364/716 |
| 4,071,902 | 1/1978 | Eichelberger et al. | 364/716 |
| 4,142,245 | 2/1979 | Baron | 364/900 |
| 4,255,768 | 3/1981 | Kubota | 360/10.2 |
| 4,307,454 | 12/1981 | Haben et al. | 364/900 |
| 4,471,456 | 9/1984 | Branigin et al. | 364/900 |
| 4,633,386 | 12/1986 | Terepin | 364/200 |
| 4,703,416 | 10/1987 | Crupi et al. | 364/200 |
| 4,807,183 | 2/1989 | Kung et al. | 364/900 |
| 5,103,355 | 4/1992 | Steele | 360/77.13 |
| 5,245,485 | 9/1993 | Dunn et al. | 360/69 |
| 5,274,515 | 12/1993 | Furuyama | 360/77.16 |

FOREIGN PATENT DOCUMENTS

| | | |
|---|---|---|
| 0075623 | 4/1983 | European Pat. Off. |
| 0238754 | 9/1987 | European Pat. Off. |
| 0267612 | 5/1988 | European Pat. Off. |

Primary Examiner—Parshotam S. Lall
Assistant Examiner—Ken S. Kim
Attorney, Agent, or Firm—Fay, Sharpe, Beall, Fagan, Minnich & McKee

[57] ABSTRACT

A microcomputer constructed on a single semiconductor substrate comprises a microprocessor CPU, a read only memory ROM, a random access memory RAM, a common bus BUS for electrically connecting the microprocessor CPU, the read only memory ROM and the random access memory RAM, a plurality of timers TM, a plurality of input/output circuits I/O, a network portion NET for bringing the timers TM and the input/output circuits I/O into a desired connectional form, and a control register CRG for controlling the network portion NET.

The control register CRG is coupled to the common bus BUS, and can have control bit information written thereinto by the microprocessor CPU. On the basis of the control bit information stored in the control register CRG, the network portion NET connects the timers TM and/or the input/output circuits I/O so as to achieve a specified circuit arrangement instructed by the control bit information.

26 Claims, 6 Drawing Sheets

FIG. 3A FAST FORWARD/REWIND MODE

FIG. 3B RECORDE/PLAY-BACK MODE

FIG. 4A VHS-C HEAD SWITCH

FIG. 4B VHS HEAD SWITCH

UNIVERSAL TIMING CONTROLLER FOR VIDEO TAPE RECORDER SERVO SYSTEM OF DIFFERENT FORMATS USING TIME MULTIPLEXED SWITCHING NETWORK

This application is a continuation application of U.S. Serial No. 07/413,265, filed Sep. 27, 1989 now abandoned.

BACKGROUND OF THE INVENTION

This invention relates to a microcomputer formed on a single semiconductor chip, and more particularly to microcomputer technology which is effective when utilized for the servo systems of video tape recorders etc.

Video tape recorders (hereinbelow, termed "VTRs") for domestic use, which are presently available as manufactured articles, are classified into VTRs of the type which is combined with a camera and VTRs of the type which is fixedly installed. As systems for recording audio signals and video signals on magnetic tapes, there are various systems such as the VHS system, SVHS system, VHS-C system, SVHS-C system, beta system and ED beta system.

Each of the VTRs includes a drum motor for rotating a drum on which a plurality of magnetic heads serving to derive the audio signals and video signals from the magnetic tape are mounted, a capstan motor for feeding the magnetic tape, and a servomechanism for automatically controlling the rotational speeds of the drum and capstan motors, etc. Such servomechanisms are brought into multifarious forms due to differences in the aforementioned recording systems, differences in the number of the magnetic heads, etc.

Meanwhile, VTR servo technology is about to progress from analog servo technology software servo technology through the use of digital microcomputers. The software servo technology is intended to automatically control, for example, the rotational speeds of the drum and capstan motors in software fashion by the use of a microcomputer. Examples of the software servo microcomputer which has a built-in hardware unit (group of timers) for VTRs (especially for 8 mm-VTRs), are 'CXP80116' offered by Sony Corporation and '$\mu$PD78112' offered by Nippon Electric Co., Ltd.

Since both the software servo microcomputers adopt constructions directed toward the VTRs of specified systems, they have the disadvantage of limited applications. Even in the VTRs of the VHS system by way of example, when the numbers of the heads or methods of generating specific waveforms or timing signals are different, the hardware needs to be reassembled in accordance with the respective sorts.

SUMMARY OF THE INVENTION

An advantage this invention is to provide a semiconductor integrated circuit device (microcomputer) which constitutes, e.g., the servo system of a household VTR having an enhanced compatibility.

The above and other advantages and novel features of this invention will become apparent from the description of the specification when read in conjunction with the accompanying drawings.

Typical aspects of performance of the embodiment this invention are briefly summarized as follows:

A microcomputer constructed on a single semiconductor substrate comprises a microprocessor CPU, a read only memory ROM, a random access memory RAM, a common bus BUS for electrically connecting the microprocessor CPU, the read only memory ROM and the random access memory RAM, a plurality of timers TM, a plurality of input/output circuits I/O, a network portion NET for bringing the timers TM and the input/output circuits I/O into a desired connectional arrangement, and a control register CRG for controlling the network portion NET.

The control register CRG is coupled to the common bus BUS, and can have control bit information written thereinto by the microprocessor CPU. On the basis of the control bit information stored in the control register CRG, the network portion NET connects the timers TM and/or the input/output circuits I/O so as to achieve a specified circuit arrangement instructed by the control bit information.

Accordingly, a hardware circuit arrangement directed toward a specific application is achieved by the software expedient of writing the control bit information from the microprocessor CPU into the control register CRG. Thus an internal circuit (hardware) whose arrangement can be varied by software is disposed within the microcomputer. As a result, the specifications of a single microcomputer can be altered to specifications for a plurality of specified applications on the basis of the software.

Noteworthy aspects of the embodiment of this invention are listed below:

(a) Hardware construction wherein the terminals of built-in timers, which are smaller in number than the event/reset input signals thereof, can be used flexibly.

(b) Hardware construction wherein hardware which is utilized in a specified operating state, but which is not utilized in the other states can be diverted to different uses by changing the connections of a system.

(c) Hardware construction wherein timer output terminals which are larger in number than the output compare registers of built-in timers can be controlled in time division.

PREFERRED EMBODIMENTS

Figure 1:
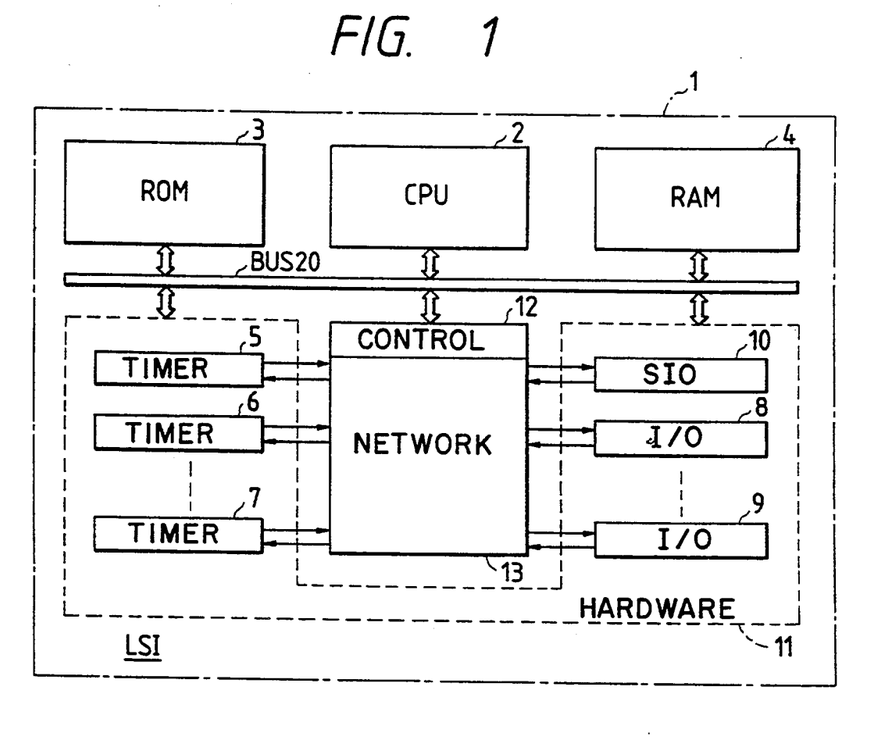
FIG. 1 is a block diagram showing an embodiment of the entirety of a semiconductor integrated circuit device according to this invention.

Shown in FIG. 1 is a block diagram in the case where an embodiment of this invention is applied to a software servo microcomputer. Various circuit blocks in the figure are formed on a single semiconductor substrate such as of single-crystal silicon by known techniques for manufacturing semiconductor integrated circuits, namely, a CMOS process or a bipolar-CMOS process. Accordingly, the integrated circuit of this embodiment is constructed of N- and P-channel MOSFETs, with or without bipolar transistors.

In hardware architectures which are necessary for servo systems for VTRs, the functions of individual timers etc. have no basic difference even among different VTR systems. In different VTR systems, only the required numbers of the timers and the interconnections thereof differ. However, insofar as the VTR systems for domestic use (the VHS, VHS-C, β and 8-mm systems) are concerned, the total numbers of the timers do not differ greatly. Accordingly, it may safely be said that the differences of the systems merely consist in the interconnections. In the embodiment, with note taken of this fact, the interconnections are permitted in software fashion by providing a network according to which control bits writable from a microprocessor (central processing unit which shall be termed "CPU" hereinbelow) and the output nodes and input nodes of built-in hardware are brought into plural-to-plural correspondence.

Therefore, the semiconductor integrated circuit device LSI 1 enclosed with a dot-and-dash line includes as the constituents of the microcomputer, the microprocessor (central processing unit) CPU 2, a read only memory ROM 3 in which programs etc. for various control operations to be executed by the microprocessor CPU 2 are stored, a random access memory RAM 4 which is used for storing data required in the control operations, and a bus 20 which electrically connects them. Further, the built-in hardware HW 11 which is enclosed with a dotted line in the figure and which includes the plurality of general-purpose timers TM 5, 6 and 7, a plurality of input/output circuits IOC 8 and 9 and a serial communication interface circuit SCI 10, and the network 13 by which the general-purpose timers TM 5–7, input/output circuits IOC 8–9, etc. of the built-in hardware HW 11 are interconnected in accordance with the control bits stored in a control register CRG 12, are provided on the identical chip.

Each of the general-purpose timers TM 5–7 of the built-in hardware HW 11 operates as a timer/counter. The input signals of the general-purpose timers TM 5–7 are assorted into an external event signal, an external reset signal, an input capture signal, etc. Besides, the aspects of applying the input signals include the application of the inputs from terminals, that of serial clock pulses, that of serial data items, that of the output signals of waveform generator circuits, etc. The output signals of the timers/counters TM 5–7 include an overflow output signal, a compare match (CM) output signal, etc. These outputs are sometimes supplied to the input nodes of the waveform generator circuits. The network NET 13 is previously formed with signal paths between elements having high possibilities of connections, among such elements as the general-purpose timers 5–7, input/output circuits IOC 8–9 and serial communication interface SCI 10 within the built-in hardware HW 11, and specified ones of the plurality of signal paths formed in the network NET 13 are selected according to the values of the control bits in the control register CRG 12. The control bit information written from the microprocessor CPU 2 into the control register CRG 12 is regarded as information for selecting from among a plurality of signals, each signal which is to be applied from the network 13 to the built-in hardware HW 11. Consequently, the interconnections between the elements within the built-in hardware HW 11 can be varied by software in accordance with the control bit information.

Figure 2:
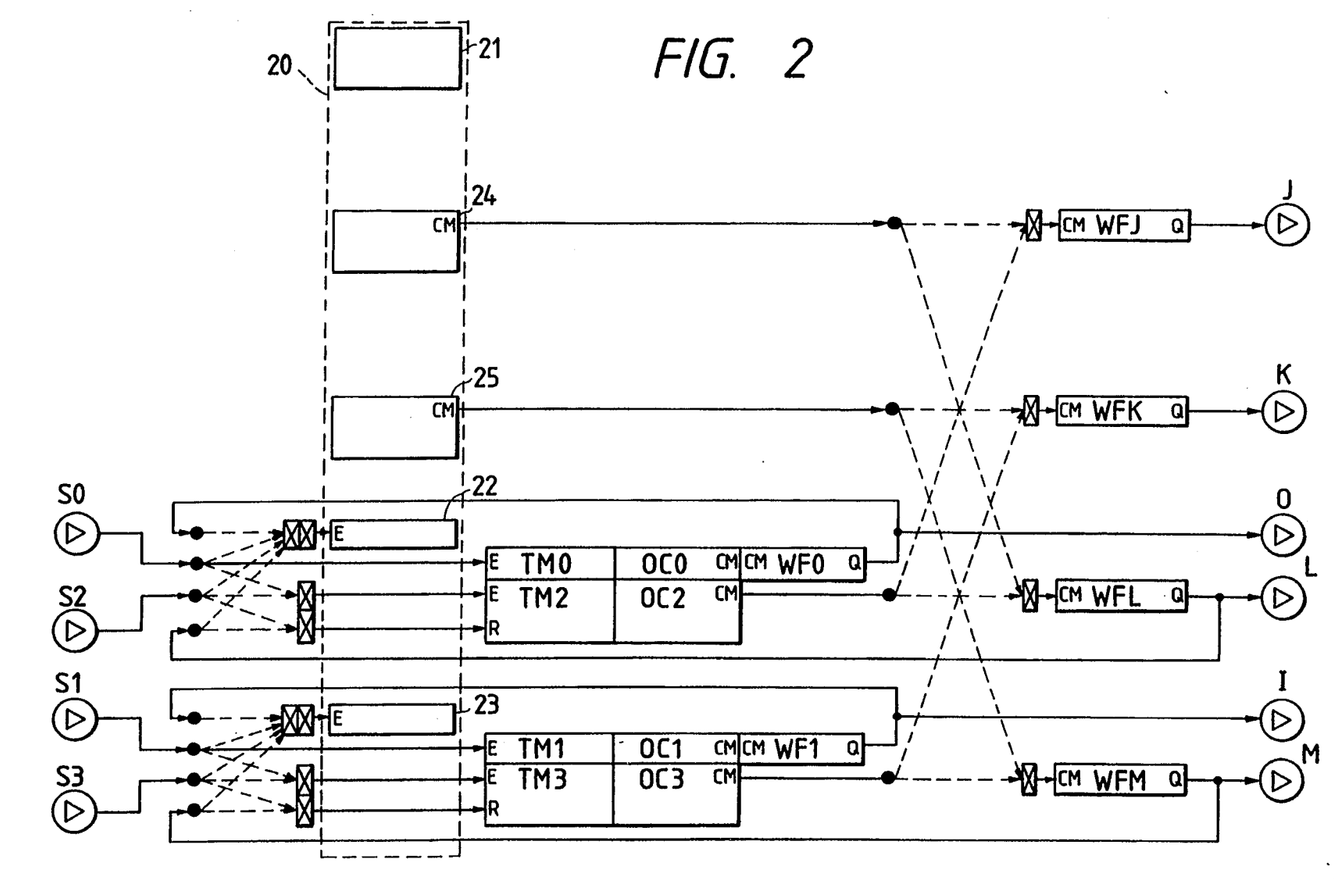
FIG. 2 is a block diagram showing the fundamental embodiment of the built-in hardware and network of the semiconductor integrated circuit device.

FIG. 2 shows a block diagram of the fundamental embodiment of the built-in hardware HW 11 and the network NET 13.

This embodiment has four terminal inputs (servo external input terminals) S0–S3. It is provided with one free-running timer FRT 20 which is enclosed with a broken line in the figure. The free-running timer FRT 20 includes a free-running counter FRC 21, input capture circuits ICA 22 and ICB 23, and output compare circuits OCX 24 and OCY 25. The embodiment is also provided with four timers/event counters, in which timers TM0–TM3 are respectively furnished with output compare circuits OC0–OC3, and in which waveform generator circuits WF0 and WF1 are respectively provided at the output nodes of the output compare circuits OC0 and OC1. The outputs Q of the waveform generator circuits WF0 and WF1 are respectively coupled to external output terminals 0 and I. Four general-purpose waveform generator circuits WFJ thru WFM are provided, and they have their outputs Q connected to external output terminals J, K, L and M, respectively. The control bits of the control register CRG 12 are provided in correspondence with parts indicated by marks in the figure. That is, the number of the control bits is 12. One of a plurality of signal transmission paths indicated by broken lines in the figure is selected by the information of each of the 12 bits. By way of example, the input node of the input capture ICA 22 is provided with the control bits numbering 2, the combination of which is used for designating one of the paths of four signals in total as consist of the terminal inputs S0 and S2 and the outputs of the waveform generator circuits WF0 and WFL. This holds true also of the other input capture ICB 23, and one of the signal transmission paths of the terminal inputs S1 and S3 and the outputs of the waveform generator circuits WF1 and WFM is designated according to the control bits composed of 2 bits.

Regarding the other circuits, for example, the timer/event counters, one of the terminal inputs S0 and S2 can be selected as the event signal E of the timer TM2, and one of the terminal input S2 and the output of the waveform generator circuit WFL can be selected as the reset signal R thereof. Similarly, one of the terminal inputs S1 and S3 can be selected as the event signal E of the timer TM3, and one of the terminal input S3 and the output of the waveform generator circuit WFM can be selected as the reset signal R thereof. The compare match signal input terminal CM of each of the waveform generator circuits WFJ–WFM selects one of the outputs of two among the compare match signal output terminals CM of the output compare circuits OCX, OCY, OC2 and OC3, so as to use it as the timing of waveform generation. In each of the circuits as stated above, one is selected from the two input signal paths, and hence, a single control bit is adequate.

The above embodiment produces the effects of the efficient use of the terminal inputs, that of idle timers, and that of the waveform generator circuits.

(1) Efficient Use of Terminal Inputs

For the 6 event signals E and 2 reset signals R totaling 8, only the four external input terminals S0-S3 are mounted on the chip as shown in FIG. 2, whereby saving in the number of input terminals can be realized. More specifically, each timer can operate even when internal signals are used as the reset signal R, the event signal E and a clock signal, so that all the signals need not always be applied from the terminals. As a result, by providing the network according to which the signal paths as indicated by the dotted lines in the figure are permitted to be selected by the control bits indicated by the marks , it becomes possible to efficiently use the external input terminals whose number is set at the required minimum for the purpose of reducing the area of the chip.

(2) Efficient Use of Idle Timers

The timer TM0 shall be considered as a kind of dedicated timer according to which, when the event signal E of high frequency is applied from the input terminal S0, the frequency is divided at a suitable rate to generate a waveform of lowered frequency, and the generated waveform is supplied to the input capture ICA 22. In contrast, in a case where the event signal E of low frequency is applied, the frequency need not be divided, and hence, the terminal input S0 can be directly coupled as the event signal E of the input capture ICA 22. In such a case, the timer/counter TM0 can be diverted to another use as the idle timer.

In the application of the VTR servo system, the diversion is embodied as stated below: A capstan motor for feeding a tape is built in the VTR, and the rotational speed thereof need to be servo-controlled. This rotational speed is obtained in such a way that the period of a signal which is electromagnetically produced from an encoder mounted on the motor is measured by utilizing the input capture. The speeds of the tape differ as much as one to two orders between in the record/playback mode and fast forward/rewind mode of the VTR.

Figure 3A:
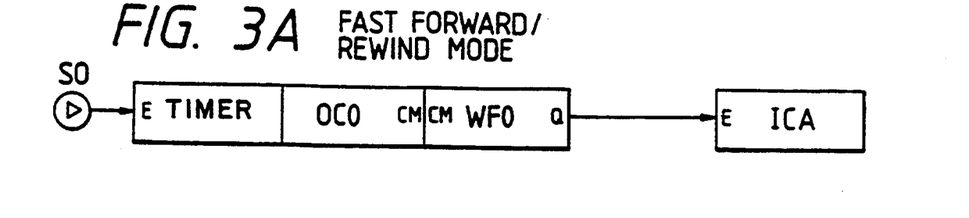
FIG. 3A is a connection diagram illustrating the use of the timers of FIG. 2 in a fast forward/rewind mode of a VTR servo system.
Figure 3B:
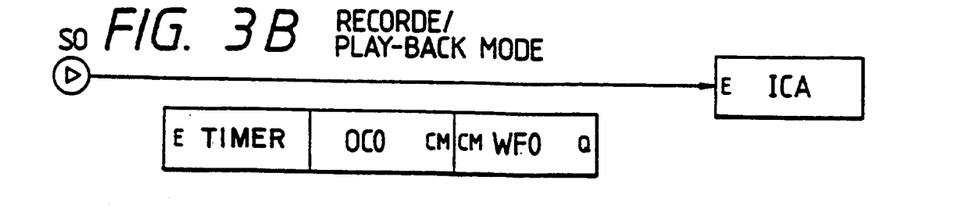
FIG. 3B is a connection diagram illustrating the use of the timers of FIG. 3A in a record/playback mode of the VTR servo system.

In the fast forward/rewind mode, therefore, the terminal input S0 has its frequency divided using the timer TM0 (OC0, WF0), as shown in FIG. 3(A). On the other hand, in the record/playback mode, the frequency dividing operation as mentioned above is unnecessary, and hence, the terminal input S0 can be directly coupled to the input capture ICA as shown in FIG. 3(B). Accordingly, the timer/event counter at TM0, OC0 and WF0 having been operated as the frequency divider circuit can be diverted to another use, and saving in the number of the timers can be attained.

(3) Efficient Use of Waveform Generator Circuits

The four waveform generator circuits WFJ-WFM in the network 13 are provided in correspondence with the four output compare circuits OCX, OCY, OC2 and OC3. It is also possible that one output compare circuit is held in correspondence with each of the waveform generator circuits WFJ-WFM. It is similarly possible that one output compare circuit is held in correspondence with a plurality of (for example, two) waveform generator circuits, and this measure can be deemed effective for saving the number of the output compare circuits.

In the application of the VTR servo system, the aforementioned measure is embodied as stated below: In the VTR, a plurality of magnetic heads for deriving a video signal from the magnetic tape are mounted on a rotary drum. In the VHS-C system which handles the video signal of the NTSC (National Television System Committee) format, each of the four magnetic heads is utilized once within a period of 15 Hz in the playback mode. The timings of switching the magnetic heads need to be given from the servo system to a video processing system.

Figure 4A:
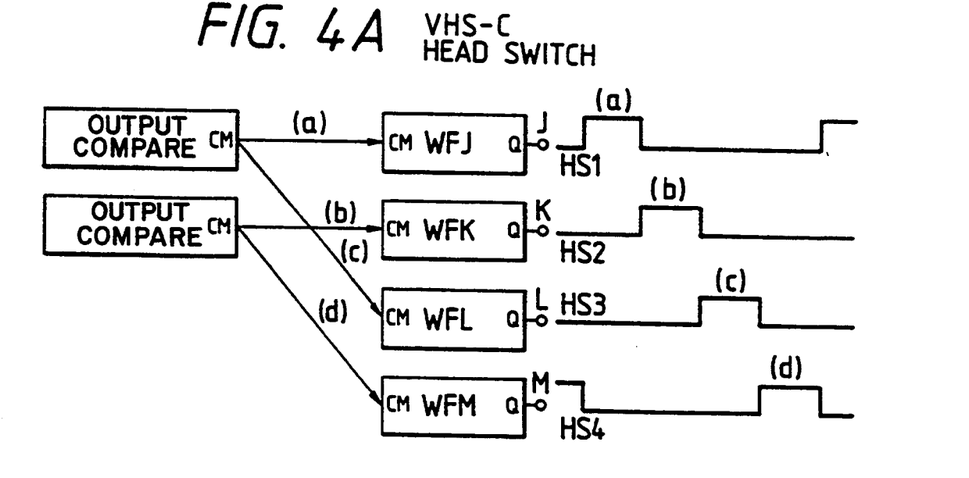
FIG. 4A is a connection diagram illustrating the use of the waveform generators of FIG. 2 in a VHS-C type VTR servo system for a head switching function.

FIG. 4(A) shows the head switching timings of the VHS-C system. As seen from the figure, regarding signals HS1 to HS4 for activating the respective heads, it can be deemed that only up to two HS1 and HS2 (or HS3 and HS4) change at proximate timings. Therefore, the activation signals HS1 to HS4 can be formed by connecting the output compare circuits OCX and OCY and the waveform generator circuits WFJ-WFM as follows: The output compare circuit OCX is coupled to the waveform generator circuit WFJ at the first timing (a), the output compare circuit OCY is switched to the waveform generator circuit WFK at the second timing (b), the output compare circuit OCX is switched to the waveform generator circuit WFL at the third timing (c), and the output compare circuit OCY is switched to the waveform generator circuit WFM at the fourth timing (d). By successively switching the corresponding relations in this manner, the four waveform generator circuits WFJ-WFM which form the respective control signals HS1-HS4 for switching the four magnetic heads can be controlled using the two output compare circuits OCX and OCY.

Figure 4B:
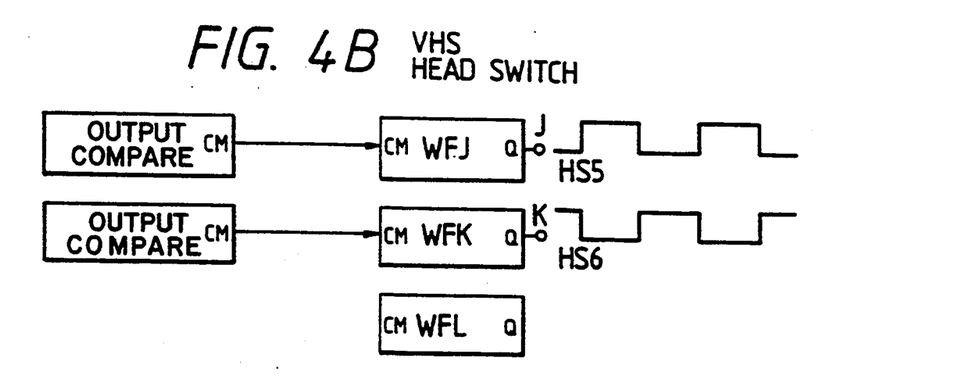
FIG. 4B is a connection diagram illustrating the use of a subset of the waveform generators of FIG. 4A in a VHS type VTR servo system for performing the head switching function.

In the VHS system being another system which handles the same video signal of the NTSC format as mentioned above, each of the two magnetic heads is utilized once within a period of 30 Hz. As shown in FIG. 4(B), therefore, control signals HS5 and HS6 for activating the respective magnetic heads can be formed by the two waveform generator circuits WFJ and WFK. Accordingly, the remaining two waveform generator circuits WFL and WFM which are not operated can be diverted to other uses.

Figure 5:
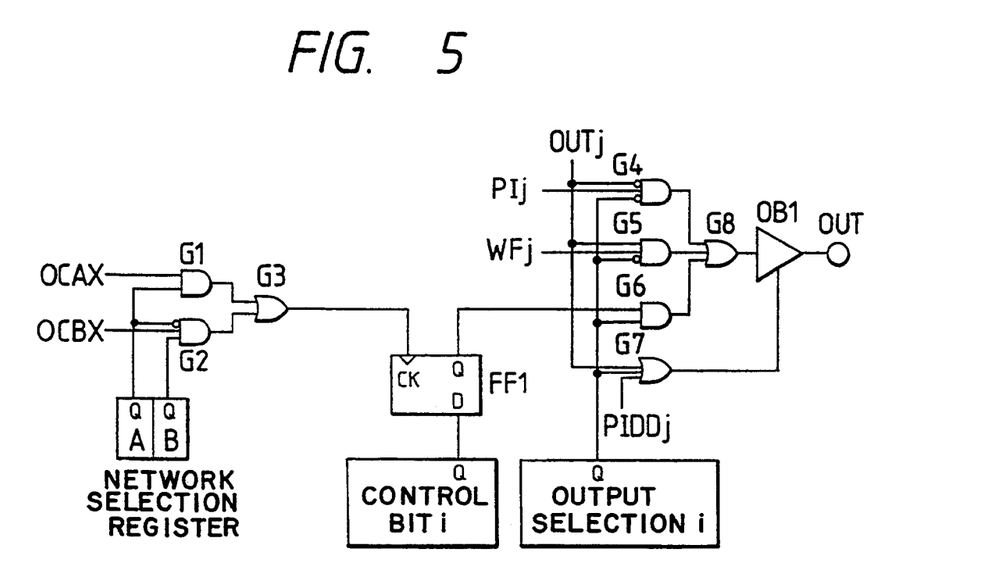
FIG. 5 is a circuit diagram for explaining an embodiment of the network portion.

FIG. 5 shows a circuit diagram of an embodiment of the network NET 13. Gate circuits to be described below can be formed of known CMOS circuits or Bi-CMOS circuits.

By way of example, in the case where two output compare circuits OCAX and OCBX are held in correspondence with one waveform generator circuit WFJ, the output of the output compare circuit OCAX is supplied to one input node of an AND gate circuit G1, and that of the output compare circuit OCBX to one input node of an AND gate circuit G2. The signal of the control bit A of a network selection register NSEL is supplied to the other input node of the AND gate circuit G1, and the inverted signal thereof to another input node of the gate circuit G2. Besides, the signal of the control bit B of the register NSEL is supplied to one remaining input node of the gate circuit G2. Therefore, when the control bit A is at logic "1", the gate circuit G1 is enabled, and the output of the output compare circuit OCAX is transmitted. When the control bit A is at logic "0" and the control bit B is at the logic "1", the gate circuit G2 is enabled, and the output of the output compare circuit OCBX is transmitted. Besides, when both the control bits A and B are at the logic "0", no output is transmitted. By the way, in a case where either of the outputs of the two output compare circuits OCAX and OCBX is selectively transmitted at all times, the control bit B is omitted.

The output signal of each of the gate circuits G1 and G2 is supplied through an OR gate circuit G3 to the clock terminal CK of a flip-flop circuit FF1 which constitutes the waveform generator circuit WFJ. The data terminal D of the flip-flop circuit FF1 is supplied with the signal of a control bit OLVLi. This control bit designates whether the waveform of the output is rendered the logic "0" or the logic "1".

The output signal Q of the flip-flop circuit FF1 is supplied to one input node of an AND gate circuit G6. The other input node of the AND gate circuit G6 is supplied with the signal of an output selection bit OUTi. In this embodiment, AND gate circuits G4 and G5 are provided in order that an output circuit OB1 may be used also for delivering the output signals WFj and PIj of the other waveform generator circuits. The signal of the output selection bit OUTi, which is supplied to the AND gate circuit G6, is inverted and then supplied to the other AND gate circuits G4 and G5. Therefore, when the control bit OUTi is at the logic "1", the AND gate circuit G6 is enabled, and the other AND gate circuits G4 and G5 are disabled. When the control bit OUTi is at the logic "0", the AND gate circuit G6 is disabled, and either of the other AND gate circuits G4 and G5 is enabled. The signal of another output selection bit OUTj is supplied to the AND gate circuit G5, and the inverted signal thereof to the AND gate circuit G4. Therefore, when the output selection bit OUTi is at the logic "0" and that OUTj is at the logic "1", the AND gate circuit G5 is enabled, thereby to transmit the signal WFj. When both the output selection bits OUTi and OUTj are at the logic "0", the AND gate circuit G4 is enabled, thereby to transmit the signal PIj. Each of the output signals of the AND gate circuits G4–G6 is transmitted to the input node of the output circuit OB1 through an OR gate G8.

The output circuit OB1 has its control terminal supplied with the output signal of an OR gate circuit G7. The input nodes of the OR gate circuit G7 are supplied with the output signals of control bits OUTi, OUTj and PIDDj. When the output signal of the OR gate circuit G7 is at the logic "1", the output circuit OB1 falls into an operating state to amplify the input signal and to send the amplified signal from an output terminal OUT. In contrast, when the output signal of the OR gate circuit G7 is at the logic "0", the output circuit OB1 falls into a non-operating state to hold the output terminal OUT in a high impedance state or at an inactivation level such as low level.

Owing to such a combination of the logic gate circuits, one signal transmission path is selected according to the control bits from among a plurality of signal transmission paths, whereby a desired circuit arrangement is made.

Figure 6:
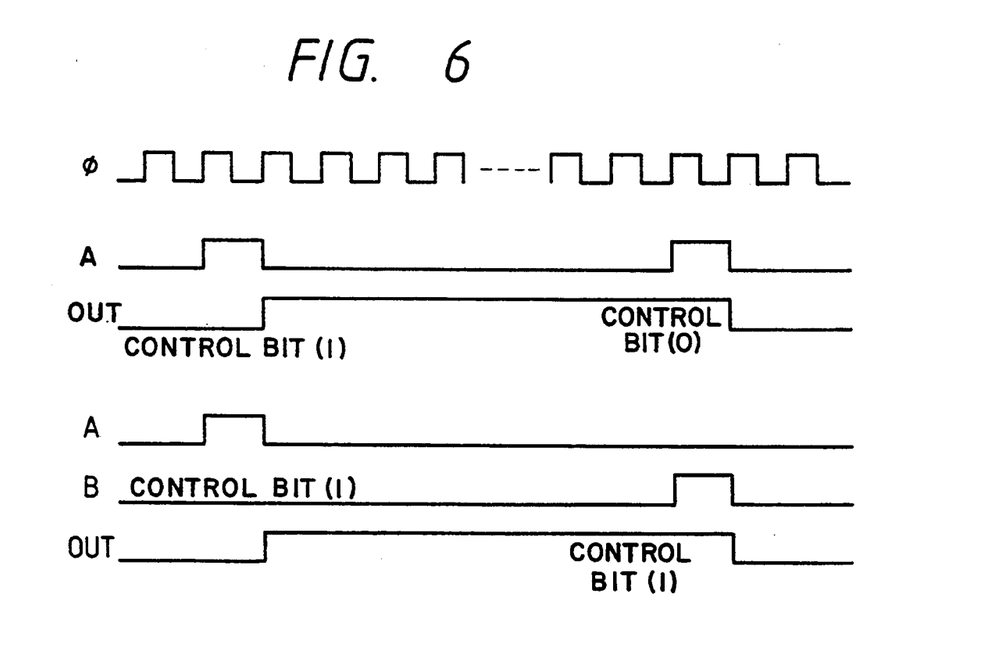
FIG. 6 is a waveform diagram for explaining examples of the operations of the waveform generator circuits.

FIG. 6 shows timing charts for explaining examples of the operation of the waveform generator circuit.

By way of example, the flip-flop FF1 in FIG. 5 forms a signal changing from a low level to a high level in accordance with the logic "1" of the control bit OLVLi, in synchronism with the timing of change from the high level to the low level of the compare match signal A (in FIG. 6) of the output compare circuit OCAX as is supplied in the state in which the AND gate circuit G1 is enabled by the control bit A. Further, the flip-flop FF1 forms a signal changing from the high level to the low level in accordance with the logic "0" of the control bit OLVLi, in synchronism with the timing of change from the high level to the low level of the pulse of the compare match signal A as is subsequently supplied.

As stated above, the output signal OUT the generation of which is determined by the specified timings can be formed by the combination between the control bit OLVLi and the compare match signal A which is formed by the single output compare circuit OCAX.

A similar operation can be effected with the control bit OLVLi and the compare match signals A and B which are respectively formed by the two output compare circuits OCAX and OCBX. In this case, the gate circuits G1 and G2 are changed-over using the control bits A and B, whereby the compare match signals A and B (in FIG. 6) are switchedly supplied to the flip-flop circuit FF1.

Although not shown in the drawings, a lock bit is provided as a control bit so that, during the output of the lock bit, the transmission of the compare match signals A and B to the flip-flop circuit FF1 may be stopped to inhibit the change of the waveform. In the circuit of FIG. 5, this function can be realized in such a way that, when the unshown lock bit is set at the logic "1" by way of example, the control bits A and B are automatically rendered the logic "0".

Figure 7:
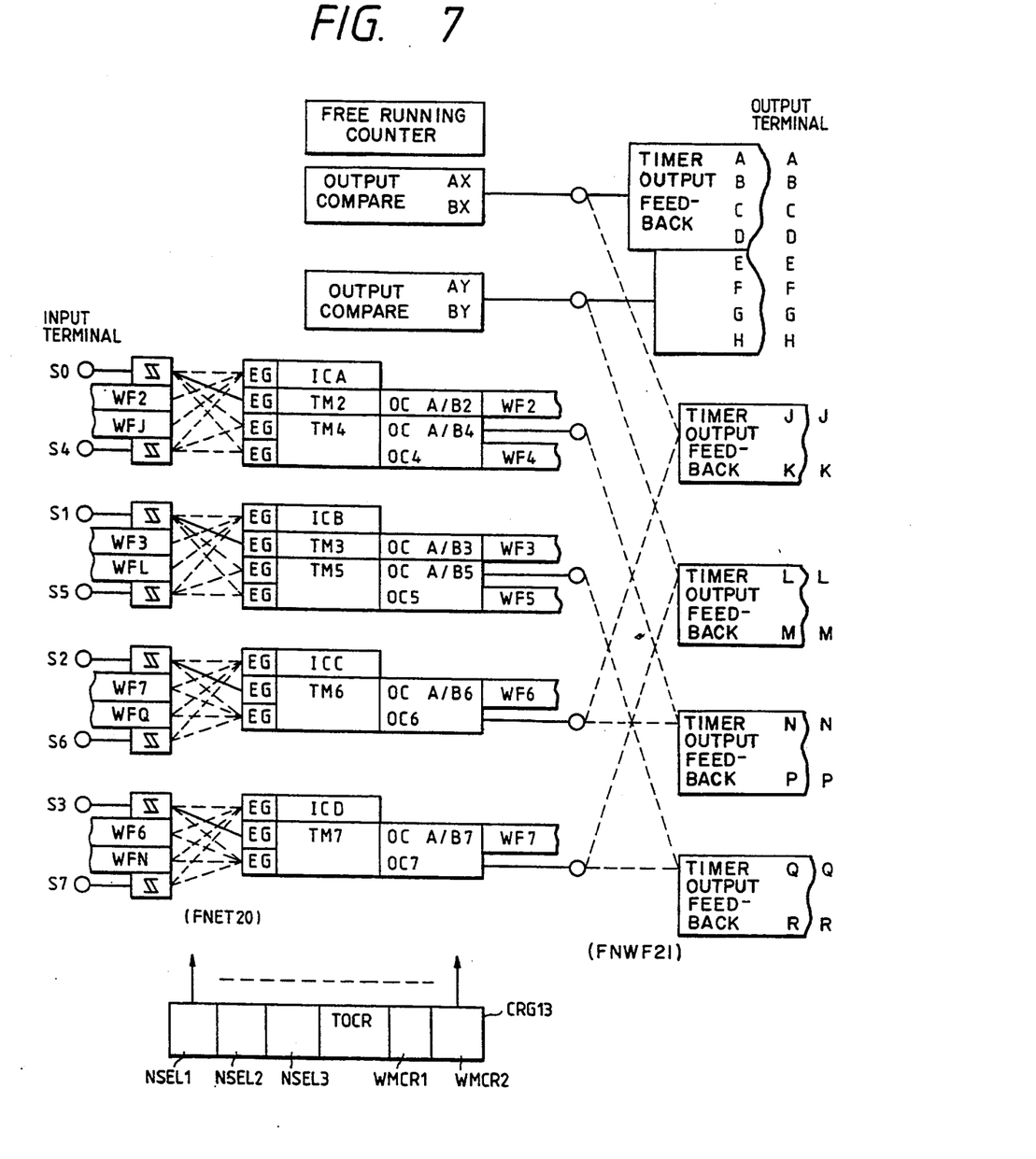
FIG. 7 is a block diagram showing an embodiment of a timer network directed toward household VTRs.

FIG. 7 shows a block diagram of an embodiment of a timer network for household VTRs.

In this embodiment, peripheral function hardware has a built-in timer network TNET in order to enhance the compatibility thereof. The timer network TNET is constructed of a timer functional network FNET 20 and a timer functional network waveform generator FNWF 21.

In the timer functional network FNET 20, eight signals at external input terminals S0–S7 and eight timer output feedback signals (WF2, WFJ, WF3, WFL, WF7, WFQ, WF6 and WFN) are applied to one set of free-running timers (input capture circuits ICA–ICD) and six timers/counters TM2–TM7.

The timer functional network waveform generator FNWF 21 includes eight waveform generator circuits WFA–WFH and eight high-function waveform generator circuits WFJ–WFR, and it can generate complicated waveforms by the use of output signals from one set of free-running timers (a free-running counter FRC and output compare circuits OCAX, BX and OCAY, BY), and compare match output signals OCA/B-4–OCA/B7 from output compare circuits OC4–OC7 which belong to the four timers/counters TM4–TM7, respectively.

The connections of the network TNET are selectively done according to control bits which are written into control registers CRG. Control bits for the waveform generation are also stored in the control registers CRG. These control registers CRG include registers stated below.

Examples of the registers for controlling the timer functional network FNET 20 are network selector registers NSEL1 to 3, while examples of the registers for controlling the timer functional network waveform generator FNWF 21 are a timer output control register TOCR and waveform mode control registers WMCR1 and 2.

The network selector register NSEL1 is constructed of a readable/writable register of 16 bits, the contents of which determine the inputs of one set of free-running timers (the four input capture circuits ICA–ICD) and the six timers/counters TM2–TM7. Although not especially restricted, this register NSEL1 is initialized to "0000H" by a reset or standby mode.

The network selector register NSEL2 is constructed of a readable/writable register of 16 bits, the contents of which determine the inputs of the eight waveform generator circuits WFA–WFH. Although not especially restricted, this register NSEL2 is initialized to "0000H" by the reset or standby mode.

The waveform mode control register WMCR1 is constructed of a readable/writable register of 8 bits, the contents of which determine the output levels of the waveform generator circuits WFA–WFH. Although not especially restricted, this register WMCR1 is initialized to "00H" by the reset or standby mode.

The timer output control register TOCR is constructed of a readable/writable register of 16 bits, the contents of which determine whether or not the outputs of the waveform generator circuits WFA–WFR are to be delivered to external terminals A–R. Although not especially restricted, this register TOCR is initialized to "0000H" by the reset or standby mode.

The network selector register NSEL3 is constructed of a readable/writable register of 4 bits, the contents of which determine the inputs of the eight high-function waveform generator circuits WFJ–WFR. Although not especially restricted, this register NSEL3 is reset to "00H" in the reset or standby mode.

The waveform mode control register WMCR2 is constructed of four readable/writable registers each having 8 bits, and the contents of the registers determine the output levels of the high-function waveform generator circuits WFJ–WFR. Although not especially restricted, this register WMCR2 is initialized to "00H" in the reset or standby mode.

Figure 8:
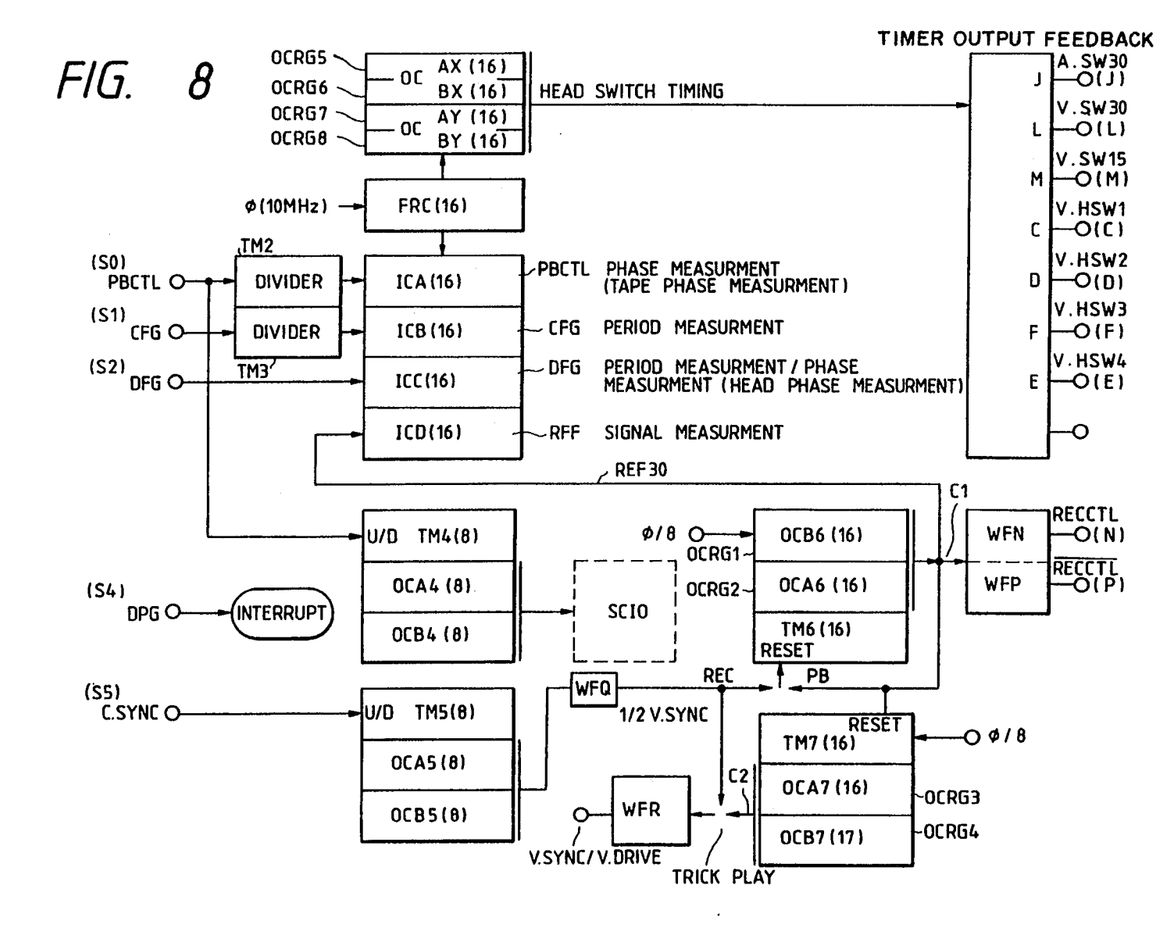
FIG. 8 is a block diagram showing an embodiment in the case where the timer network is applied to the VHS-C system.

FIG. 8 shows a block diagram of an embodiment in the case where the timer network in FIG. 7 is applied to the VHS-C system. Numerals indicated within parentheses ( ) in the figure denote the numbers of bits. For example, FRC(16) represents a free-running counter of 16 bits.

A drum motor and a capstan motor are controlled by circuit blocks to be described below. The rotational speed of the capstan motor is evaluated in such a way that the output signal CFG of a capstan frequency generator (not shown) is received at a terminal S1 and has its frequency divided by a timer TM3, and that the frequency of the resulting signal is measured by an input capture circuit ICB. Accordingly, the speed error of the rotational speed of the drum motor can be detected in such a way that the difference between the speed measured as stated above and a command speed is calculated by the microprocessor CPU 2 (in FIG. 1).

Likewise, the rotational speed of the drum motor is evaluated in such a way that the output signal DFG of a drum frequency generator (not shown) is received at a terminal S2, and that the frequency of the output signal DFG is directly measured by an input capture circuit ICC. Accordingly, the error of the rotational speed of the capstan motor can be detected by calculating the difference between the measured speed and a command speed by means of the microprocessor CPU 2.

Phase errors are detected as stated below. The phase of a reference signal REF 30 is measured by an input capture circuit ICD, and the result is set as a reference time. In a record mode (REC mode), the reference signal REF 30 is produced in synchronism with a signal ½ V.SYNC obtained by dividing the frequency of a vertical synchronizing signal V.SYNC by 2, while in any mode other than the record mode, it is produced by self-oscillation. The difference between the phases of a video head and the reference signal REF 30 is evaluated in such a way that the time of the pulse of the output signal DFG of the drum frequency generator nearest the video head is measured by the input capture circuit ICC, whereupon the component of a mounting error is corrected. The reference pulse of the output signal DFG is specified by the application of the output signal DPG of a drum phase generator (not shown) to a terminal S4, namely, by the interrupt of the signal DPG. The difference between the phases of a video track on a tape and the reference signal REF 30 is evaluated in such a way that the time of the output signal PBCTL of a playback control circuit (not shown) applied to a terminal S0 is measured by an input capture circuit ICA and is subjected to an X-value correction.

The motor control proceeds as follows: The microprocessor CPU 2 calculatively obtains the speed error and the phase error, and it subjects them to synthesis processing and filter processing in software fashion, thereby to compute the control voltage value of the motor. Here, a control voltage to be supplied to the motor is subjected to pulse width modulation (PWM) by the use of a PWM circuit built in the semiconductor integrated circuit LSI 1 (in FIG. 1), and the resulting voltage is supplied to the motor.

A timer TM6 produces the reference signal REF 30 and a record control signal RECCTL. The leading edge of the reference signal REF 30 is utilized as the reference time in the whole servo system. In a playback mode, the reference signal REF 30 is set at a signal of 30 Hz in such a way that the frequency of a system clock ∅/8 (where ∅ is 10 MHz) is divided using one output compare register (OCRG1) of the timer TM6 (by the self-oscillation). In the record mode, the timer TM6 has the signal ½ V.SYNC supplied to its reset terminal and is controlled so as to be cleared by the edge of the signal ½ V.SYNC. Besides, it produces the reference signal REF 30 and a signal C1 indicative of the timing of change of the record control signal RECCTL by the use of two output compare registers (OCRG1 and 2).

A time TM7 is used for producing a vertical drive signal V.DRIVE. The timer TM7 is cleared by the leading edge of the signal REF 30, and it counts up in synchronism with the timer TM6. In a special playback mode, the timer TM7 produces a signal C2 indicative of the timing of change of the signal V.DRIVE by the use of two output compare registers OCRG3 and 4. The signal V.DRIVE is formed by a waveform generator circuit WFR on the basis of the change timing signal C2.

A timer TM5 is utilized for producing the signals ½ V.SYNC and V.SYN. The timer TM5 is supplied with a composite synchronize signal C.SYNC from a terminal S5, so as to detect the rise/fall timings of the signal V.SYNC.

A free-running timer FRT (FRC, OCAX, OCAY, OCBY and OCBY) is used in order to produce video head switching signals V.HSW1-4, an audio head switching signal A.SW30 and video head switching signals V.SW30/15. Since the numbers of the video head switching signals differ between in the full-size VHS system and in the VHS-C system, the control algorithms are converted as shown in FIGS. 4(A) and 4(B) accordingly.

In the case of the full-size VHS system, the free-running timer FRT is cleared by the leading edge of the signal REF 30. In the record mode, the signal REF 30 synchronizes with the signal V.SYNC, and hence, note needs to be taken of the fact that the clear timings of the free-running timer FRT are not always regular. The values of the four output compare registers (OCRG5-8) are respectively set at the timings of changes of the audio head switching signal A.SW30 and the video head switching signal V.SW30, and the waveforms of these signals are produced by waveform generator circuits WFJ and L on the basis of the values.

In the case of the VHS-C system, the free-running timer FRT is operated as the very free-running timer. The timings of changes of the head switching signals need to be found through additions to the time of every pulse of the signal DFG. The four output compare registers (OCRG5-8) are set at the change timings of the required ones of the signals V.SW30, V.SW15 and V.HSW1-4 every pulse of the signal DFG, and the waveforms of the respective signals are produced while the input sources of waveform generator circuits WFC, D, E, F, L and M are being switched.

Functional effects which are attained by the foregoing embodiments are as follows:

(1) Any desired ones of internal circuits are interconnected by a network which is controlled according to control bits stored in a control register, thereby to bring forth the effect that an internal circuit arrangement for a specified application can be constructed by the software of writing the bits into the control register.

(2) Owing to Item (1), each timer can operate using internal signals as a reset signal, an event signal and a clock signal, and all signals need not always be applied as terminal inputs. This brings forth the effect that the efficient use of the terminal inputs is permitted.

(3) Owing to Item (1), there is brought forth the effect that specified ones of timers/counters are set as idle timers in accordance with operation modes and can be diverted to other uses.

(4) Owing to Item (1), a plurality of output compare circuits are held in correspondence with a plurality of waveform generator circuits, thereby to bring forth the effect that saving in the number of the output compare circuits is permitted, so the scale of a circuit can be made smaller with the functions thereof maintained.

Although, in the above, the invention made by the inventors has been concretely described in conjunction with embodiments, it is needless to say that the present invention is not restricted to the foregoing embodiments, but that it can be variously altered within a scope not departing from the purport thereof. For example, the number and combination of the various circuits constituting each timer and the practicable circuit arrangements thereof can adopt various aspects of performance. In addition, the network for interconnecting the various circuit blocks may well be any other than that based on the combination of the logic circuits as stated before, such as one utilizing a multiplexer, as long as it can change-over signal transmission paths in accordance with control signals. Unlike that controlled by the built-in microprocessor as stated before, the timer network may well be one which is controlled by a control circuit having specified functions, an external microprocessor, or the like. The read only memory ROM can be replaced with an electrically programmable or/and erasable ROM, namely, EPROM or EEPROM. In this case, a program to be executed by the microprocessor can be externally written. In case of altering the program, accordingly, a turnaround time (TAT) can be shortened as compared with that in the case where the read only memory is formed of a mask ROM.

This invention can be extensively utilized for semiconductor integrated circuit devices each having a general-purpose timer function.

An effect which is achieved by a typical aspect of performance of this invention, is briefly explained as follows: Any desired ones of internal circuits are interconnected by a network which is controlled according to control bits stored in a control register, whereby an internal circuit arrangement for a specified application can be constructed by the software of writing the bits into the control register.

What is claimed is:

1. In combination with a video tape recorder servo system, a semiconductor integrated circuit device comprising:

a set of external input terminals for receiving servo data input signals into the integrated circuit device from said video tape recorder servo system;

it plurality of internal circuits for electrically processing said servo data input signals, the plurality of internal circuits including a plurality of general purpose timer circuits, each of the plurality of general purpose timer circuits having at least one input node, the input nodes of the plurality of general purpose timer circuits collectively forming an input node set, the input node set being less in number than said set of external input terminals;

network circuit means for selectively electrically connecting said set of external input terminals to said input node set in time division based upon control data generated within said semiconductor integrated circuit device independent from said externally received servo data input signals to effect a multiplexed timing control over said video tape recorder servo system;

a set of timer output circuits connected to said plurality of general purpose timer circuits;

a set of external output terminals for supplying output signals from said set of timer output circuits to said video tape recorder servo system; and, control register means, coupled to said network circuit means and to said plurality of internal circuits, for storing therein said control data for controlling said network circuit means to selectively electrically connected a one of the set of general purpose timer circuits with a one of the set of external input terminals according to the control data to control said output signals effecting said multiplexed timing control over said video tape recorder servo system.

2. The combination according to claim 1, wherein said network circuit means comprises a plurality of gated logic circuits responsive to the control data generated within said semiconductor integrated circuit device for electrically manipulating said servo data input signals received from said video tape recorder servo system.

3. The combination according to claim 1, wherein said semiconductor integrated circuit device further comprise microprocessor means, coupled to said control register means for writing said control data into said control register means.

4. The combination according to claim 3, wherein said semiconductor integrated circuit device comprises a single semiconductor substrate.

5. The combination according to claim 1, wherein said plurality of internal circuits further comprise a set of waveform generator circuit means, connected to said set of external output terminals and to said control register means, for generating timing signals for use by said video tape recorder servo system.

6. The combination according to claim 5, wherein each of said plurality of general purpose timer circuits includes an event input node and a reset input node collectively forming an event/reset node set, the set of external input terminals being less in number than the event/reset node set; and, wherein said network circuit means further comprises connecting means for selectively connecting said set of external input terminals with the event/reset node set in accordance with the control data.

7. The combination according to claim 6 wherein said semiconductor integrated circuit device further comprise diverter means for diverting a set of general purpose timers not connected by the connecting means to other functional uses by said video tape recorder servo system within the semiconductor integrated circuit device.

8. The combination according to claim 5, wherein said semiconductor integrated circuit device further comprises control means for controlling said network circuit in accordance with the control data such that the output signals of said set of output timer circuits are supplied to said set of external output terminals in a time division fashion to effect said multiplexed timing control over said video tape recorder servo system.

9. A single-chip microcomputer in a servo system of a video tape recorder, the single-chip microcomputer, comprising:
data processing means for executing data processing;
a set of external input terminals for selective communication of first data between the single-chip microcomputer and said servo system;
a plurality of external output terminals for supplying output signals from the single-chip microcomputer to said servo system of the video tape recorder;
a plurality of internal circuits including a plurality of timer circuits each of the plurality of timer circuits having at least a one of an event input node for receiving a first signal starting a timer circuit timing operation, a timer output circuit and a reset input node for receiving a second signal initiating a timer circuit resetting operation, the event input nodes and the reset input nodes of the plurality of timer circuits collectively forming an event/reset node set less in number than said set of external input terminals, and the timer output circuits forming a set of timer output circuits;
coupling means for electrically coupling: i) a first selected one of said plurality of internal circuits to a second selected one of said plurality of internal circuits and ii) ones of said set timer output circuits to ones of said plurality of external output terminals to effect a multiplexed timing control over said servo system of the video tape recorder; and,
control means, coupled to said data processing means and to said coupling means, for controlling a coupled state to be achieved by said coupling means, exclusively in accordance with control information supplied within said single-chip microcomputer from said data processing means to said control means, to effect a timing control over said servo system of the video tape recorder.

10. The single-chip microcomputer in a servo system of a video tape recorder according to claim 9, wherein said data processing means includes means for altering the control information exclusively within said microcomputer to effect changes in the coupling state.

11. The single-chip microcomputer in a servo system of a video tape recorder according to claim 9, wherein said coupling means comprises means for connecting said set of external input terminals with the event and reset input nodes of said plurality of timer circuits exclusively in accordance with the control information to effect changes in the coupling state.

12. The single-chip microcomputer in a servo system of a video tape recorder according to claim 11, wherein said single-chip microcomputer further comprises diverting means for diverting ones of the plurality of timer circuits not connected by said coupling means to other uses by said servo system of the video tape recorder within the single-chip microcomputer.

13. The single-chip microcomputer in a servo system of a video tape recorder according to claim 9, wherein the set of external output terminals is smaller in number than that of said set of timer output circuits, and wherein said network circuit is controlled exclusively in accordance with the control information such that the output signals of said set of timer output circuits are selectively supplied to said set of external output terminals in time division to effect said multiplexed timing control over said servo system of the video tape recorder.

14. A network circuit in a video tape recorder servo system, the circuit comprising:
a first set of servo external input terminals for cooperative electrical communication with said video tape recorder servo system;
a second set of external servo output terminals for cooperative electrical communication with said video tape recorder servo system;
a plurality of general purpose timer circuits, each of the plurality of general purpose timer circuits having a timer event input node and a timer reset input node defining a third set of event/reset nodes being greater in quantity than the first set of servo external input terminals;
a plurality of waveform generator circuits for generating timing signals for use by said video tape recorder servo system, each of the plurality of waveform generator circuits having an i) input node for receiving a head timing signal and ii) a waveform generator output node connected to a one of the second set of external servo output terminals;
a plurality of timer output circuits, each connecting said plurality of general purpose timer circuits with said plurality of waveform generator circuits, and each for generating a head timing signal; and,
connecting means for selectively multiplexedly connecting i) preselected ones of the first set of servo external input terminals with preselected ones of the third set of event/reset nodes being greater in quantity than the first set of servo external input terminals, ii) preselected ones of the plurality of waveform generator circuits with preselected ones of the second set of external servo output terminals, and iii) preselected ones of the plurality of timer output circuits with preselected ones of the plurality of waveform generator circuits based upon control data generated within said network circuit independent of said video tape recorder servo system to effect a multiplexed timing control over said video tape recorder servo system.

15. The network circuit in a video tape recorder servo system of claim 14 wherein the connecting means for selective connection comprises:

control register means for storing connection data received from said video tape recorder servo system;

first logic means, responsive to the connection data, for logically connecting preselected ones of the first set of servo external input terminals with preselected ones of the plurality of general purpose timer circuits;

second logic means, responsive to the connection data, for logically connecting preselected ones of the plurality of waveform generator circuits with preselected ones of the second set of external servo output terminals; and, third logic means, responsive to the connection data, for logically connecting preselected ones of the plurality of timer output circuits with preselected ones of the plurality of waveform generator circuits.

16. The network circuit in a video tape recorder servo system of claim 14 further comprising:

a plurality of input capture circuits, each of the plurality of input capture circuits having an input capture circuit event node; and, second connecting means for selectively connecting preselected ones of the first set of servo external input terminals with preselected ones of i) the third set of event/reset nodes of the network circuit and ii) the input capture circuit event nodes of the network circuit.

17. The network circuit in a video tape recorder servo system of claim 14 wherein the connecting means for selective connection comprises:

a plurality of input capture circuits, each of the plurality of input capture circuits having an input capture circuit event node;

control register means for storing connection data received from said video tape recorder servo system;

first logic means, responsive to the connection data, for logically connecting the first set of servo external input terminals with preselected ones of i) the third set of event/reset nodes of the network circuit and ii) the input capture circuit event nodes of the network circuit; and, second logic means, responsive to the connection data, for selectively connecting preselected ones of the plurality of waveform generator circuits with preselected ones of the second set of external servo output terminals.

18. The network circuit in a video tape recorder servo system of claim 14 wherein the connecting means for selective connection comprises:

control register means for storing connection data received from said video tape recorder servo system; and, logic means, responsive to the connection data, for logically connecting ones of the plurality of waveform generator circuits with ones of the third set of event/reset nodes of the network circuit.

19. The network circuit in a video tape recorder servo system of claim 18 further comprising second logic means, responsive to the connection data, for logically connecting ones of the plurality of timer output circuits with i) ones of the third set of event/reset nodes, and ii) ones of the plurality of waveform generator circuits to effect a selectable timing control over said video tape recorder servo system.

20. A semiconductor integrated circuit device in combination with a tape recorder system, the semiconductor integrated circuit device comprising:

an internal circuit including a plurality of timer circuit means for performing a timing operation, each of said plurality of timer circuit means having at least a one of an event input node and a reset input node;

a plurality of external input terminal means for selective communication of first signals between the semiconductor integrated circuit device and said tape recorder system, the plurality of external input terminal means being less in number than that of the cumulative number of event input nodes and reset input nodes of the plurality of timer circuit means;

network circuit means, responsive to control information generated within said semiconductor integrated circuit device exclusive of said first signals, for selectively electrically coupling ones of the plurality of external input terminal means to ones of the event input nodes and reset input nodes such that a selected first one of the plurality of external input terminal means is electrically coupled to a selected first one of the event or reset input nodes to effect a timing control over said tape recorder system;

plurality of external output terminal means for selective communication between the semiconductor integrated circuit device and said tape recorder system;

a plurality of waveform generator circuits having outputs coupled to the plurality of external output terminal means in turn connected to the tape recorder system; and, control register means coupled to the network circuit means for storing said control information wherein the plurality of timer circuit means include timer output circuits, wherein the network circuit means comprises means responsive to the control information for coupling ones of the timer output circuits to a selected one of the plurality of waveform generator circuits in time division to effect a multiplexed timing control over said tape recorder system.

21. The combination according to claim 20, wherein the network circuit means includes a plurality of logic gate means, responsive to the control information stored in the control register, for performing logic operations.

22. The combination according to claim 21, further comprising data processing means, coupled to the control register means, for writing the control information into the control register.

23. The combination according to claim 22, wherein the semiconductor integrated circuit device is formed on a single semiconductor substrate.

24. The combination according to claim 22, wherein a first predetermined timer circuit means of the plurality of timer circuit means includes a first output node, wherein the network circuit means further includes coupling circuit means, responsive to the control register means, for coupling said first output node of the first predetermined timer circuit means to at least a one of the event input node and the reset input node of the first predetermined timer circuit means.

25. A single-chip microcomputer for use in a control system of a video tape recorder comprising:
a central processing unit;
a plurality of external output terminals including a first external output terminal, a second external output terminal, a third external output terminal and a fourth external output terminal;
plurality of external input terminals receiving timing signals from said video tape recorder into the single-chip microcomputer;
a first output compare circuit and a second output compare circuit, each having an input connected to at least one said plurality of external input terminals and an output, for generating switch timing signals to control head switching operations regarding a selection of magnetic heads mounted on a drum of the video tape recorder;
a plurality of waveform generators including a first waveform generator, a second waveform generator, a third waveform generator and a fourth waveform generator, each having an input and an output, wherein outputs of the first through fourth waveform generators are coupled to the first through fourth external output terminals, respectively;
network means for coupling outputs of the first and second output compare circuits with inputs of selected ones of the first to fourth waveform generators in response to a control signal; and,
a control register coupled to the network means for storing the control data supplied from the central processing unit to control an operation of the network means and for generating the control signal to the network means based on the control data stored therein,
wherein when the video tape recorder is used in a VHS system, the network means couples the outputs of the first and second output compare circuits to the inputs of the first and second waveform generators, respectively, and
wherein when the video tape recorder is used in a VHS-C system, the network means selectively couples the output of the first output compare circuit to the inputs of the first and third waveform generators and the network means selectively couples the output of the second output compare circuit to the inputs of the second and fourth waveform generators so that the first to fourth waveform generators output head activation signals to the first to fourth external output terminals, successively.

26. The single-chip microcomputer according to claim 25, further comprising a bus coupling the central processing unit with the control register.

* * * * *

UNITED STATES PATENT AND TRADEMARK OFFICE
CERTIFICATE OF CORRECTION

PATENT NO. : 5,371,881
DATED : December 6, 1994
INVENTOR(S) : Katsumi Iwata

It is certified that error appears in the above-indentified patent and that said Letters Patent is hereby corrected as shown below:

Claim 1, column 12, line 31, delete "it" and substitute therefor --a--.

Claim 3, column 13, line 5, delete "comprise" and substitute therefor --comprises--.

Claim 7, column 13, lines 28-29, delete "comprise" and substitute therefor --comprises--.

Claim 9, column 13, line 67, before "timer" insert --of--.

Claim 20, column 16, line 43, before "plurality" insert --a--.

Claim 25, column 17, line 22, before "plurality" insert --a--; and, line 27, before "said" insert --of--.

Signed and Sealed this

Seventh Day of March, 1995

Attest:

BRUCE LEHMAN

*Attesting Officer*  *Commissioner of Patents and Trademarks*